United States Patent [19]
Ostapchenko

[11] Patent Number: 4,693,941
[45] Date of Patent: Sep. 15, 1987

[54] REINFORCED POLY(ETHYLENE TEREPHTHALATE) COMPOSITIONS

[75] Inventor: George J. Ostapchenko, Wilmington, Del.

[73] Assignee: E. I. Du Pont de Nemours and Company, Wilmington, Del.

[21] Appl. No.: 762,874

[22] Filed: Aug. 6, 1985

Related U.S. Application Data

[63] Continuation-in-part of Ser. No. 390,684, Jun. 21, 1982, abandoned, which is a continuation-in-part of Ser. No. 223,024, Jan. 6, 1981, abandoned.

[51] Int. Cl.$^4$ ............... B32B 27/06; B29C 43/02; C08L 67/02; C08K 7/14
[52] U.S. Cl. .................... 428/480; 264/544; 264/553; 525/176; 524/449; 524/494; 524/513
[58] Field of Search ............... 525/176; 524/449, 494, 524/513; 264/553, 544; 428/480

[56] References Cited

U.S. PATENT DOCUMENTS 4,020,126 4/1977 Gander et al. ............... 264/553
4,172,859 11/1979 Epstein ............... 428/402

Primary Examiner—Lewis T. Jacobs
Assistant Examiner—Robert E. L. Sellers

[57] ABSTRACT

Poly(ethylene terephthalate) compositions containing a small amount of a terpolymer of ethylene containing carboxyl groups, which may be partly or completely converted to a divalent metal salt form, and reinforced with a mineral material having an aspect ratio of at least 10 can be formed into sheets which are readily thermoformable at moderate pressures and have very good thermoforming radius ratios.

16 Claims, No Drawings

REINFORCED POLY(ETHYLENE TEREPHTHALATE) COMPOSITIONS

CROSS-REFERENCE TO RELATED APPLICATION

This is a continuation-in-part of my copending application Ser. No. 390,684, filed June 21, 1982, now abandoned, which was a continuation-in-part of my copending application Ser. No. 223,024 filed Jan. 6, 1981, and now abandoned.

BACKGROUND OF THE INVENTION

This invention relates to reinforced poly(ethylene terephthalate) compositions which can be extruded into sheets that are readily thermoformed at moderate pressures, below about 690 kPa, to give articles having well defined surface boundaries.

Polyethylene terephthalate has long been used as an injection-molding and extrusion resin for the fabrication of various articles for household or industrial use, including appliance parts, containers, and small auto parts. Because many of such articles must withstand considerable temperature changes and/or physical abuse, it is customary to blend poly(ethylene terephthalate) with other polymers which would improve its toughness and resistance to cracking. Additional improvement of its mechanical properties is obtained by reinforcement, especially with fibrous materials, principally with glass fibers. While many types of glass fiber-reinforced poly(ethylene terephthalate) compositions are available, they require the use of high pressure injection molding techniques. Typical of such compositions are those described in U.S. Pat. No. 4,124,561 to Phipps et al. Injection molding, normally carried out at about 20,000 to 100,000 kPa, requires considerably more energy than the conventional lower pressure operations such as, for example, thermoforming or hot sheet stamping, which are satisfactory for non-reinforced poly(ethylene terephthalate) compositions. Accordingly, it is very desirable to make available to the industry reinforced compositions capable of being formed into sheets that can be thermoformed at lower pressures, for example, from less than about 690 kPa to about 5520 kPa.

"Thermoforming" means fabricating in a single mold in which a sheet, at a temperature at least equal to the softening temperature but below the melting temperature of the resin from which it is made, is exposed on one side to a reduced pressure and on the other side to at least atmospheric pressure.

SUMMARY OF THE INVENTION

According to this invention, there is now provided a composition in sheet form having a crystallinity of about 0-5%, thermoformable at a pressure of 690 kPa to an article having a thermoforming radius ratio of at most 3.3, said composition consisting essentially of the following components in stated weight proportions:

(a) 50-80% of poly(ethylene terephthalate) having an inherent viscosity of more than 0.55 dl/g;

(b) 3-10% of at least one terpolymer of ethylene with an ethylenically unsaturated carboxylic acid and with an ester of an ethylenically unsaturated carboxylic acid or with a vinyl ester; the respective proportions of the carboxylic acid and of the ester in the terpolymer being about 1 to 30 weight percent of each;

said terpolymer having 0-100% of its carboxylic groups converted to their salt form, the cation being a divalent metal ion;

with the proviso that up to about 20% of the recited component (a) can be replaced by a polymer compatible with poly(ethylene terephthalate) and selected from the class consisting of polyesters, polvamides, and polycarbonates, and that up to 40% of the recited component (b) may be replaced by a copolymer of ethylene with a vinyl ester; and (c) 10-50% of a reinforcing material having an aspect ratio of at least 10.

For the purpose of this disclosure and claims, the term "consisting essentially" means that small amounts of other materials may be present in the above compositions in addition to the recited components, so long as they do not detract from the operability of this invention.

DETAILED DESCRIPTION OF THE INVENTION

Sheets made from the compositions of the present invention have good thermoformability. For the purpose of this invention, the quality of thermoformability is judged by measuring the radius between the bottom and the wall of a molded dish, as described later in this disclosure. The better the thermoformability the closer the radius of the thermoformed dish matches the mold radius. Well formed articles can be obtained from many commercial reinforced compositions at higher pressures, but at moderate pressures the edge definition is poor. Sheets made from the compositions of the present invention, on the other hand, are capable of being molded into dishes having a radius between the bottom and the side wall at most 3.3 times that of the mold.

The thermoformable sheets of the present invention, which have a crystallinity of 0-5%, are for the purpose of the present invention considered to be amorphous. Accordingly, components which would promote crystallization should be avoided or at least used in amounts such that the purposes of this invention would not be defeated.

Generally speaking, the essence of this invention resides in the discovery of conditions under which a PET sheet reinforced with a material having a high aspect ratio has a sufficiently low viscosity to be thermoformable. Addition of such high aspect ratio fillers increases the sheet viscosity, possibly by chemical or physical interactions with the resin, while the terpolymer, when used in a sufficient amount, reduces the viscosity of the filled resin to a point where it is within the practical range. Crystallization of PET also increases viscosity and therefore must be minimized.

Suitable reinforcing materials may be fibrous or non-fibrous, for example, lamellar. They must, however, have one very small dimension relative to their largest dimension. The ratio of the largest to the smallest dimension is known as the aspect ratio. For fibers, the aspect ratio is the ratio of length to diameter (L/D). Ordinary granular or irregularly shaped particles are not suitable in this application. Suitable nonfibrous materials include, for example, glass flakes and platelets of various types of mica such as muscovite and biotite as well as of graphite.

The most important reinforcing fiber which is used in the compositions of the present invention is glass fiber. Other reinforcing fibers include, for example, graphite, boron nitride, aluminum oxide, and metal whiskers, such as steel. Various organic reinforcing fibers can also be used, including various polyamides and especially Du Pont Company's high strength "KEVLAR" polyamide fiber. However, the benefits of this invention are realized principally with mineral fiber reinforcing agents, which are hard and stiff and thus pose special problems. The reinforcing agent should have a good adhesion to the polymeric composition. A mixture of fibrous and nonfibrous reinforcing materials may be used in the same composition. The preferred amount of reinforcing material is 20–40% of the composition. The preferred aspect ratio of the reinforcing material is about 10 to 35.

Poly(ethylene terephthalate) is a well-known commercial resin available from Goodyear Tire and Rubber Company under the trademark "CLEARTUFF" and from Hoechst under the trademark "ARNITE". The usual molding grades have fairly high inherent viscosities, which are determined according to the method described in U.S. Pat. No. 4,172,859 to Epstein. An inherent viscosity of 0.55 dl/g corresponds to a number average molecular weight of about 17,700.

Terpolymers of ethylene with an unsaturated carboxylic acid and with an ester of an unsaturated acid or with a vinyl ester are known. The typical esters include, for example, methyl acrylate, ethyl methacrylate, isobutyl acrylate, diethyl fumarate, dimethyl maleate and vinyl acetate. The terpolymers suitable in the process of the present invention are described, for example, in U.S. Pat. No. 3,264,272 to Rees.

Many such terpolymers are commercially available, either from E. I. du Pont de Nemours and Company or from other sources.

The preferred terpolymer is one where the carboxylic acid is methacrylic acid and the ester is isobutyl acrylate. The preferred proportion of the carboxylic acid and of the ester comonomer in the terpolymers is 5 to 15% of each based on the total weight of the terpolymer.

While the addition to poly(ethylene terephthalate) of an ethylene terpolymer usually results in some deterioration of the physical properties of the resulting molding composition, the terpolymers of this invention, and especially the preferred terpolymer, when used in a reinforced composition of poly(ethylene terephthalate) molding resin have only a minimal adverse effect on the physical properties of the composition. This is due to the fact that it is sufficient to add them at low levels to improve the resin's thermoformability at moderate pressures.

The carboxyl group-containing terpolymers usually are converted at least in part to the salt form or, as it is usually expressed in the industry, are neutralized to a certain degree. Such neutralization is obtained by adding to the carboxyl group-containing polymeric material a calculated amount of a metal salt, for example, zinc acetate or magnesium acetate, and heating the mixture to a temperature below about 140° C., while thoroughly mixing the materials together. The resulting partly or completely neutralized carboxylic group-containing polymeric material is known generically as an ionomer. Some of such ionomeric materials are available commercially, for example "SURLYN" ionomer resin of the Du Pont Company. Ionomers obtained by neutralization with a monovalent cation are ineffective in improving the thermoforming radius ratio because they promote crystallization of poly(ethylene terephthalate). Various ionomeric materials and the methods by which they may be prepared are described, among others, in the following U.S. Pat. Nos. 3,264,272 to Rees and 3,639,527 to Brinkmann et al. It is believed that the ionomers are crosslinked, at least in part, through the metal ion, thus having exceptional toughness.

The preferred compositions of this invention are those where component (a) is poly(ethylene terephthalate); component (b) is a terpolymer with methacrylic acid and isobutyl acrylate; and component (c) is glass fiber. Certain ethylene copolymers, such for example as ethylene/butyl acrylate/glycidyl methacrylate, should preferably be avoided because they accelerate crystallization of the polyester resin.

Other components may also be present in the compositions of the present invention, for example, ordinary fillers, preferably not over 10% of the total weight of components (a), (b), and (c); pigments; stabilizers; and antioxidants; provided that they are non-nucleating. Talc, for example, is normally undesirable since it promotes crystallization of the polyester resin.

The crystallinity of crystallized, reinforced plastic sheet is determined from density measurements as follows:

First, sheet density is calculated from the following equation:

$$D_2 = X_2/(1/D_s - X_1/D_1 - X_3/D_3)$$

where
$D_2$ = poly(ethylene terephthalate) density
$X_2$ = poly(ethylene terephthalate) weight fraction
$D_s$ = Sample composite sheet density
$D_1$ = Reinforcing agent density
$X_1$ = Reinforcing agent weight fraction
$X_3$ = ethylene terpolymer weight fraction
$D_3$ = ethylene terpolymer density The density of the composite sheet is determined by measuring the apparent loss of weight while the sheet is immersed in deaerated, distilled water and using the following equation:

$$D_s = D_H (WA/(WA-WH))$$

where
$D_H$ = Density of water taken as 1.0
WA = Sample weight in air
WH = Sample weight in water The percent crystallinity is determined using the following equation:

$$\text{Percent Crystallinity} = [(D_2 - DA)/(DC - DA)] \times 100$$

where
DA = Density of amorphous poly(ethylene terephthalate)
DC = Density of 100% crystalline poly(ethylene terephthalate)

For PET DA = 1.333 g/cm³ and DC = 1.455 g/cm³.

The compositions of the present invention are particularly suitable for making thermoformable reinforced sheets for use in automotive applications. Thus, such sheet can be thermoformed into a variety of automotive parts, especially body panels, both interior and exterior, dashboards, floorboards, air dams, headliners, window decks, hoods, truck lids, seats, and underbody parts. Non-automotive applications of sheets made from the compositions of the present invention include, among others, aircraft parts such as body panels, seats, and ducts; shipping containers; construction elements such as siding panels, overhead garage door panels, and partitions; marine parts such as boat body panels, seating, and deck surfaces; appliance parts including body panels, ducts, and small appliance housings; institutional food service trays; sanitary ware such as toilet seats, towel dispensers, and shower enclosures; solar collectors; enclosures and housings for a variety of equipment, including electronic equipment, pumps, X-ray machines, and lawnmowers; furniture such as chairs and tables; and a host of other industrial, residential, recreational and transportation uses.

This invention is now illustrated by the following examples of certain representative embodiments thereof, where all parts, proportions and percentages are by weight. The test sheets had a starting crystallinity of 0-5%.

The symbols V, G, and C in the last column of the Tables stand, respectively, for (highly) viscous, good, and crystallized.

PROCEDURE

Sheeting, 1.52 mm thick, was prepared by dry blending the ingredients and extruding with a 28 mm twin screw extruder at 280° C. melt temperature through a 15.2 cm wide slot die having a 2.29 mm gap. The sheeting was quenched on a three-roll finisher (20.3 cm diameter rolls) having a 1.52 mm gap and maintained at a 50° C. middle roll temperature and 20° C. top and bottom roll temperature. Discs, 10.2 cm in diameter, were cut from the extruded sheeting, preheated to 120° C. and thermoformed into a 1.27 cm deep dish-shaped mold heated to 140°-150° C., having an outer diameter of 7.62 cm and an inner diameter of 6.67 cm. The radius between the bottom and side wall of the dish was 1.14 mm. A vacuum of about 8 kPa was applied to the space between the mold and the sheet and 690 kPa air pressure was applied to the top of the sheet. The extent to which the molded sheet matches the shape of the mold is determined by measuring the radius between the bottom and side wall of the dish and then dividing this value by the radius in the mold. This is called the thermoforming radius ratio, and a value of 1 indicates perfect thermoformability.

Example 1

Effect of Ionomer Concentration

Sheeting was prepared as described above using the following components:

poly(ethylene terephthalate) having an inherent viscosity of 0.72 dl/g, amount as shown in the table below;

glass fiber, from Owens-Corning Corporation, 0.0095 mm diameter, 4.76 mm long chopped strand, 30% of the composition; and a terpolymer of ethylene, methacrylic acid, and isobutyl acrylate in respective weight ratios of 80:10:10, 73% neutralized with zinc ions. Dishes were molded from this sheeting, and their thermoforming radius ratios were determined as described above. The results are given below in Table I:

TABLE I

| Poly(ethylene terephthalate), % | Terpolymer, % | Thermoforming Radius Ratio | Rating |
|---|---|---|---|
| 70 | 0 | 8.4 | V |
| 69 | 1 | 5.3 | V |
| 67 | 3 | 3.3 | G |
| 65 | 5 | 2.6 | G |
| 63 | 7 | 2.1 | G |
| 60 | 10 | 1.6 | G |

It can be seen that even as little as 1% of the ionomeric terpolymer improves the thermoforming radius ratio by a considerable margin. When the level of this additive increases to 10%, the thermoforming radius ratio is excellent.

EXAMPLE 2

Effect of Reinforcing Agent Concentration and Aspect Ratio

The effect of reinforcing agent concentration on thermoformability is shown in Table II for three different terpolymer concentrations. In this case the reinforcing agent is glass fiber. The amounts of the components are given as weight percent of the final composition. It can be seen that it is more difficult to achieve good thermoformability as the glass fiber content increases.

TABLE II

| Amount of Terpolymer | Amount of Glass Fiber | Thermoforming Radius Ratio | Rating |
|---|---|---|---|
| 0 | 10 | 1.0 | G |
| 0 | 20 | 4.0 | V |
| 0 | 30 | 8.4 | V |
| 5 | 10 | 1.0 | G |
| 5 | 20 | 1.0 | G |
| 5 | 30 | 2.6 | G |
| 10 | 10 | 1.0 | G |
| 10 | 20 | 1.0 | G |
| 10 | 30 | 1.6 | G |

This table shows, however, that the addition of the ionomeric terpolymer helps improve thermoformability even with increasing glass fiber concentration.

The effect of reinforcing agent aspect ratio is shown in Table III. In this case the composition contained either 65% of poly(ethylene terephthalate), 30% of fiber, and 5% terpolymer (same as used in the previous determinations) or 70% of poly(ethylene terephthalate), 25% of mica, and 5% of the same ionomeric terpolymer. The aspect ratio of all the reinforcing materials was estimated from the relationship established for the average fiber L/D between flex modulus, fiber content, and fiber L/D, as published by G. E. Padawer, and N. Beecher, *Poly. Eng. & Sci.*, May 1970, Vol. 10, No. 3, pp. 185-192.

TABLE III

| Reinforcing Agent | Aspect Ratio | Thermoforming Radius Ratio | Rating |
|---|---|---|---|
| Glass Fiber | 17 | 1.0 | G |
| Glass Fiber | 26 | 2.9 | G |
| Glass Fiber | 27 | 3.2 | G |
| Wollastonite Fiber | 15 | 1.0 | G |
| Processed Mineral Fibers | 15 | 1.0 | G |
| Franklin (CaSO4) Fibers | 12 | 1.0 | G |
| Mica | 32 | 1.7 | G |

EXAMPLE 3

Effect of Ionomer

Copolymers of ethylene with methacrylic acid or terpolymers with methacrylic acid and another monomer were used in compositions containing 65% of poly(ethylene terephthalate), 30% of glass fiber, and 5% of copolymer or terpolymer. In one run, a mixture of two terpolymers in a 4:1 ratio was used. The monomer ratios of these copolymers and terpolymers, their degrees of neutralization with zinc ions, and their melt indices are shown in Table IV. The above poly(ethylene terephthalate) compositions were extruded into sheets, which were thermoformed into dishes as described above. Their thermoforming radius ratios also are shown in Table IV.

TABLE IV

| Copolymer or terpolymer (cation) | Monomer Ratio | Melt Index | % Neut. | Thermoforming Radius Ratio | Rating |
|---|---|---|---|---|---|
| E/MA* (Zn) | 90/10 | 1.1 | 71 | 5.1 | V |
| E/MA* (Zn) | 89/11 | 5.0 | 57 | 4.0 | V |
| E/MA* (Zn) | 88/12 | 1.6 | 38 | 5.1 | V |
| E/MA* (Zn) | 91/9 | 4.4 | 18 | 5.6 | V |
| E/MA/IBA** (Zn) | 80/10/10 | 1.0 | 73 | 2.6 | G |
| E/MA/IBA** | 80/10/10 | 1.0 | 0 | 2.9 | G |
| E/MA/IBA** (Zn), 4% | 80/10/10 | 1.0 | 73 | 2.4 | G |
| E/VAc/MA***, 1% | 71/28/1 | 6.0 | 0 | | |
| E/MA* (Na) | 85/15 | 0.9 | 15 | 11**** | C |
| E/MA/IBA** (Na) | 80/10/10 | 1.0 | 73 | 11**** | C |

*ethylene/methacrylic acid copolymer
**ethylene/methacrylic acid/isobutyl acrylate terpolymer
***ethylene/vinyl acetate/methacrylic acid terpolymer
****Sheets had a higher crystallinity than 5%

It can be seen from the above data that both zinc-neutralized and completely unneutralized terpolymer as well as zinc neutralized copolymer improve the thermoforming radius ratios, the terpolymer much more effectively than the copolymer. By contrast, both sodium-neutralized copolymer and terpolymer are ineffective in improving the thermoforming radius ratio. If anything, they appear to have detrimental effect on the thermoforming radius ratio.

EXAMPLE 4

Effect of Other Copolymers or Terpolymers

While the terpolymers of this invention and the corresponding ionomers improve the thermoforming radius ratio very effectively, other copolymers and terpolymers give scattered results. Although definite improvement is seen in some cases, none is dramatic, while no improvement or a deterioration is seen in other cases. As can be seen in Table V, on weight basis, no other copolymer or terpolymer used attains the effectiveness of the terpolymer of ethylene, methacrylic acid, and isobutyl acrylate of this invention. All data were obtained for a composition containing 30% of glass fiber. The amount of poly(ethylene terephthalate) thus was equal to 70% minus the percentage of polymer added.

TABLE V

| Polymer Added | Weight % | Thermoforming Radius Ratio | Rating |
|---|---|---|---|
| Copolyetherester A* | 5 | 6.9 | C |
| Copolyetherester A* | 10 | 3.8 | C |
| Copolyetherester B* | 5 | 9.6 | C |
| Copolyetherester B* | 10 | 5.8 | C |
| Copolyetherester C* | 5 | 11 | C |
| Ethylene/Vinyl Acetate Copolymer* | 10 | 4.7 | V |
| Ethylene/Methacrylic acid/ monoethyl maleate terpolymer* | 10 | 8.9 | V |
| Acrylic copolymer** | 10 | 8.0 | V |
| E/MA/iBA* (Zn) See Table IV | 5 | 2.6 | G |
| E/MA/iBA* See Table IV | 5 | 2.9 | G |

*E. I. du Pont de Nemours and Company
**Rohm and Haas Company

EXAMPLE 5

Effect of a Nucleating Agent

Poly(ethylene terephthalate) sheeting with and without talc was prepared and thermoformed according to the above-described procedure, except that the sheets were extruded through a 17.8 cm, instead of 15.2 cm, wide slot die and that the melt temperature in the extruder was 270° C., instead of 280° C. The components were the same as listed in Example 1 of the above-identified application. Talc (a known nucleating agent) was obtained from Fisher Scientific Company. In three parallel experiments, the amount of glass fibers was 30 weight percent and the amount of terpolymer was 5 weight percent. In the first run, the composition thus contained 65% of PET, 30% of glas fibers, and 5% of terpolymer. The thermoforming radius ratio was 1.7. In the second run, the composition contained 64% of PET, 30% of glass fibers, 5% of terpolymer, and 1% of talc. The thermoforming radius ratio increased to 3.0. In the third run, the amount of talc in the composition was raised to 5%; the viscosity of the composition increased to the point that it did not flow sufficiently to be extruded into sheets. This example shows the deleterious effect of the addition of a nucleating agent.

EXAMPLE 6

Effect of the Valency of the Neutralizing Metal Ion

A terpolymer of ethylene, methacrylic acid, and isobutyl acrylate, in which the monomers were present in their respective weight ratios of 80:10:10 was neutralized to the extent of 71% with various metal ions. Blends containing 65% of poly(ethylene terephthalate), 30% of glass fiber, and 5% of ionomer were made, extruded into sheets, and thermoformed according to the above-described procedure. The following results were obtained:

TABLE VI

| Cation | Thermoforming radius ratio | Rating |
|---|---|---|
| Sodium | 11.1 | C |
| Potassium | 11.1 | C |
| Cobalt | 2.9 | G |
| Copper | 1.0 | G |
| Magnesium | 3.3 | G |
| Zinc | 2.6 | G |

This example shows that divalent ions do not adversely affect the thermoforming radius ratio, while monovalent ions increase it to an impermissible value.

EXAMPLE 7

Use of Unneutralized Terpolymer

The following compositions were prepared, extruded into sheets, and thermoformed according to the above-described general procedure:

| Run | Poly(ethylene terephthalate) | Glass fiber | Terpolymer |
|---|---|---|---|
| 1 | 67 | 30 | 3 |
| 2 | 65 | 30 | 5 |
| 3 | 63 | 30 | 7 |

Both poly(ethylene terephthalate) and glass fiber were the same as described in Example 1. The terpolymer was an unneutralized ethylene/methacrylic acid/n-butyl acrylate terpolymer in which the respective comonomer weight ratios were 80:10:10.

The thermoforming radius ratios of the resulting thermoformed dishes were determined to be as follows:

TABLE VII

| Run | Thermoforming Radius Ratio | Rating |
|---|---|---|
| 1 | 2.4 | G |
| 2 | 2.1 | G |
| 3 | 1.9 | G |

The above data show that the ethylene/methacrylic acid/n-butyl acrylate terpolymer is a suitable component in the compositions of this invention, and that the thermoforming radius ratio of the compositions decreases as the amount of this terpolymer increases.

EXAMPLE 8

Use of an Inoperable Ethylene Copolymer

Runs Ia and Ib

A blend was prepared as follows:
65% of poly(ethylene terephthalate) having an inherent viscosity of 0.72 dl/g,
5% of an ethylene/methacrylic acid/isobutyl acrylate 80:10:10 terpolymer, and
30% of Owens-Corning glass fiber of 0.0095 mm diameter and 4.76 mm length.
This blend was formed into sheets and thermoformed as before. The thermoforming radius ratios of test dishes were as follows:
Run Ia 2.4
Run Ib 3.0.

Runs IIa and IIb 59.5% of poly(ethylene terephthalate) having an inherent viscosity of 0.72 dl/g,
7.0% of an ethylene/butyl acrylate/glycidyl methacrylate 67.5:28:4.5 terpolymer,
3.5% of Plasthall 809 (C. P. Hall Co.) plasticizer[1], and
30.0% of Owens-Corning glass fiber of 0.0095 mm diameter and 4.76 mm length.

*(1) poly(ethylene glycol) 400 bis(ethyl-hexanoate)

The above blend was processed as above. However, these sheets had an impractically high crystallinity and could not be fully thermoformed into the standard test dishes, and their thermoforming radius ratios could not be determined. It had been earlier determined that ethylene/butyl acrylate/glycidyl methacrylate terpolymer promotes crystallization of poly(ethylene terephthalate), and that sheets made of blends of these two polymers become more crystalline and stiffer as the temperature increases.

I claim:

1. A process for thermoforming an article from a sheet of a composition having a crystallinity of 0–5% and consisting essentially of the following components in stated approximate weight proportions:
   (a) 60–77% of poly(ethylene terephthalate) having an inherent viscosity of more than 0.55 dL/g;
   (b) 3–10% of at least one terpolymer of ethylene selected from the class consisting of ethylene/methacrylic acid/isobutyl acrylate terpolymer, ethylene/methacrylic acid/n-butyl acrylate terpolymer, and ethylene/vinyl acetate/methacrylic acid terpolymer, the respective proportions of methacrylic acid and of isobutyl acrylate, n-butyl acrylate, or vinyl acetate in the terpolymer being about 1 to 30 weight percent of each;
   said terpolymer having 0–100% of its carboxylic groups converted to their salt form, the cation being a divalent metal ion;
   with the first proviso that up to about 20% of the recited component (a) can be replaced by a polymer compatible with poly(ethylene terephthalate) and selected from the class consisting of polyesters, polyamides, and polycarbonates; and
   (c) 20–30% of a reinforcing material having an aspect ratio of at least 10%;
   with a second proviso that the composition does not contain nucleating agents;
   the process comprising the following steps:
   (A) placing the sheet in a single mold maintained at a temperature of about 140°–150° C.,
   (B) applying a vacuum of about 8 kPa to one side of the sheet, while a pressure of about 690–5520 kPa is applied to the other side of the sheet, to cause the sheet to deform and collapse onto the mold, thus conforming its shape to that of the mold,
   (C) releasing the vacuum and the pressure, and
   (D) removing the resulting molded article from the mold.
2. The process of claim 1 wherein the reinforcing material is a mineral fiber.
3. The process of claim 2 wherein the fiber is glass fiber.
4. An article thermoformed by the process of claim 1.
5. An article of claim 4 selected from the class consisting of automotive parts, aircraft parts, construction elements, marine parts, appliance parts, food service trays, sanitary articles, solar collectors, and equipment housings.
6. An article of claim 5 made of a composition containing a filler having an aspect ratio of about 10–35.
7. An article of claim 6 wherein the filler in glass fibers.
8. An article of claim 7 which is an automotive part.
9. An article of claim 7 which is an aircraft part.
10. An article of claim 7 which is a marine part.
11. An article of claim 7 which is a construction element.
12. An article of claim 7 which is a food service tray.
13. An article of claim 7 which is a sanitary article.
14. An article of claim 7 which is a solar collector.
15. An article of claim 7 which is an equipment housing.
16. An article of claim 7 which is an article of furniture.

* * * * *